United States Patent
Fujisawa (10) Patent No.: US 8,015,575 B2
(45) Date of Patent: Sep. 6, 2011

(54) DISK DEVICE WITH INSERTION SLOT CAPABLE OF PREVENTING DOUBLE LOADING OF DISKS

(75) Inventor: Shinichi Fujisawa, Akiruno (JP)

(73) Assignee: TEAC Corporation, Tama-shi, Tokyo (JP)

( * ) Notice: Subject to any disclaimer, the term of this patent is extended or adjusted under 35 U.S.C. 154(b) by 330 days.

(21) Appl. No.: 12/428,374

(22) Filed: Apr. 22, 2009

(65) Prior Publication Data

US 2009/0271808 A1 Oct. 29, 2009

(30) Foreign Application Priority Data

Apr. 25, 2008 (JP) .................................. 2008-115485

(51) Int. Cl.
G11B 33/02 (2006.01)
G11B 17/04 (2006.01)
(52) U.S. Cl. ....................................................... 720/623
(58) Field of Classification Search .......... 720/619–623, 720/646–647, 631
See application file for complete search history.

(56) References Cited

U.S. PATENT DOCUMENTS

| | | | | |
|---|---|---|---|---|
| 4,785,365 A | * | 11/1988 | Ohkita | 720/647 |
| 5,537,378 A | * | 7/1996 | Uehara et al. | 369/30.75 |
| 5,870,368 A | * | 2/1999 | Nakamichi | 720/645 |
| 6,404,720 B1 | * | 6/2002 | Inoue | 720/647 |
| 6,918,128 B2 | * | 7/2005 | Hasegawa et al. | 720/647 |
| 7,634,781 B2 | * | 12/2009 | Hoshinaka et al. | 720/623 |
| 7,739,700 B2 | * | 6/2010 | Chiou et al. | 720/620 |
| 2001/0001606 A1 | * | 5/2001 | Horie | 369/77.2 |
| 2003/0002422 A1 | * | 1/2003 | Hasegawa et al. | 369/77.1 |
| 2005/0060731 A1 | * | 3/2005 | Aoyama et al. | 720/651 |
| 2007/0234375 A1 | * | 10/2007 | Fujisawa | 720/711 |
| 2007/0250843 A1 | | 10/2007 | Fujisawa | |

FOREIGN PATENT DOCUMENTS

JP 2007293981 A 11/2007

* cited by examiner

*Primary Examiner* — Brian Miller
(74) *Attorney, Agent, or Firm* — Seed IP Law Group PLLC (57) ABSTRACT

An optical disk device has a casing, an insertion slot and a loading mechanism for loading a disk. A shutter is shiftable transversely to an elongate slot shape of the insertion slot, closes the insertion slot partially when in a closed position, and opens the insertion slot when in an open position. A coupling hole is disposed at an end of the shutter with respect to the elongate slot shape. A shift lever moves the coupling hole in a first direction along the elongate slot shape upon shifting of the loading mechanism for loading, and moves the coupling hole in a second direction upon shifting of the loading mechanism for unloading. A cam mechanism shifts the shutter to the closed position when the coupling hole is moved in the first direction, and shifts the shutter to the open position when the coupling hole is moved in the second direction.

7 Claims, 8 Drawing Sheets

DISK DEVICE WITH INSERTION SLOT CAPABLE OF PREVENTING DOUBLE LOADING OF DISKS

BACKGROUND OF THE INVENTION

1. Field of the Invention

The present invention relates to a disk device with an insertion slot. More particularly, the present invention relates to a disk device in which double loading of disks through an insertion slot can be prevented effectively.

2. Description Related to the Prior Art

A disk as an optical information recording medium is used with a computer, car navigator and other electronic instruments, and stores information of a great amount, for example CD, DVD, Blu-ray disk and the like. An optical disk device or optical disk drive is loaded with the disk for writing and reading information. There are two types of optical disk devices incorporated in an electronic instrument, including a tray type having a tray for placement of the disk, and a slot-in type having an insertion slot for loading and unloading the disk. When the disk is set into the insertion slot defined in a bezel in the optical disk device of the slot-in type, a transport assembly or disk loading mechanism is actuated automatically for loading the disk.

The slot-in type of the optical disk device has a feature having no tray, and is widely used in a notebook type of personal computer owing to characteristics of the small size and light weight. The disk is rotated at a high speed in the optical disk device for writing and reading information. If a user inadvertently inserts another disk during the writing or reading operation, an accident will occur, for example, the disk will be broken, or mechanisms in the optical disk device will be damaged.

U.S.P. Pub. No. 2007/0250843 (corresponding to JP-A 2007-293981) discloses the optical disk device including a shutter for opening and closing the insertion slot for preventing double loading of the disk. In the document, there is a cam plate on which the shutter is mounted in a rotatable manner. When the disk is absent in the optical disk device, the shutter is set in an open position. When the disk is inserted in the insertion slot and set in a writing/reading position by the loading mechanism, the shutter is rotated to a closed position. The optical disk device includes a shift lever and a slider. The shift lever is swung in response to operation of the loading mechanism. The slider is slid by the shift lever. A slot in the slider receives insertion of a pin of the shutter. When chucking of the disk is started in the writing and playing position, the slider is moved by the loading mechanism and the shift lever. The shutter is guided by a cam groove formed in the base panel when the slider moves, and rotationally shifts to a closed position about the pin.

However, it is necessary in U.S.P. Pub. No. 2007/0250843 (corresponding to JP-A 2007-293981) to incorporate the slider in addition to the shutter and the shift lever. The number of the parts will be remarkably high also with the complicated structure of the shutter. The manufacturing cost will be remarkably high.

SUMMARY OF THE INVENTION

In view of the foregoing problems, an object of the present invention is to provide a disk device in which double loading of disks through an insertion slot can be prevented effectively.

In order to achieve the above and other objects and advantages of this invention, a disk device for writing and/or reading data in a disk in a casing is provided. An insertion slot is formed in the casing. A loading mechanism loads the disk in the casing or unloads the disk from the casing through the insertion slot. A shutter is shiftable between a closed position and an open position, for closing the insertion slot at least partially to prevent the disk from passing when in the closed position, and for opening the insertion slot to allow the disk to pass when in the open position. A shift lever is disposed for connection between the loading mechanism and the shutter, moves the shutter in a first direction along an elongate slot shape of the insertion slot upon passage of the disk through the insertion slot according to operation for loading the disk, and moves the shutter in a second direction reverse to the first direction before passage of the disk through the insertion slot according to operation for unloading the disk. A cam mechanism includes a cam surface and a cam follower projection, the cam surface being formed with one of the shutter and a stationary plate portion of the casing, the cam follower projection being formed with a remaining one of the shutter and the stationary plate portion, the cam mechanism shifting the shutter to the closed position when the shutter moves in the first direction, and shifting the shutter to the open position when the shutter moves in the second direction.

The loading mechanism includes a loading motor for rotating forwards upon advance of the disk into the insertion slot at a predetermined depth, and for rotating backwards for unloading. A loading slider slides in a direction according to one of rotational directions in which the loading motor rotates. Plural arms are driven by the loading slider, for swinging in contact with the disk.

The shift lever includes a cam pin disposed at a second lever end portion. The loading slider includes a cam groove for receiving insertion of the cam pin for engagement.

Also, a disk device is provided, there being a casing for containing a disk. An insertion slot passes the disk to load in the casing. A loading mechanism loads the disk in the casing or unloads the disk from the casing through the insertion slot. A shutter is shiftable transversely to an elongate slot shape of the insertion slot, for closing the insertion slot at least partially when in a closed position, and for opening the insertion slot when in an open position. A shift lever is movable pivotally, connected with the loading mechanism, for moving the shutter in a first direction along the elongate slot shape in response to shifting of the loading mechanism in a loading direction, and for moving the shutter in a second direction along the elongate slot shape in response to shifting of the loading mechanism in an unloading direction. There are a cam surface and a cam follower projection, a first one of which is disposed in a manner stationary on the casing, and a second one of which is formed with the shutter, the cam surface and the cam follower projection being engaged with one another, for shifting the shutter to the closed position when force in the first direction is applied to the shutter, and for shifting the shutter to the open position when force in the second direction is applied to the shutter.

The shift lever includes a first lever end portion connected with the loading mechanism. A second lever end portion is disposed to extend toward the shutter. The shutter includes a coupling portion, disposed at a shutter end with respect to the first direction, connected with the second lever end portion, and moved by the shift lever.

The cam surface is disposed stationarily, and the cam follower projection is formed with the shutter.

The shutter includes a coupling hole formed in the coupling portion, for receiving insertion of the second lever end portion and for moving linearly when driven thereby.

The shutter includes a shutter blade for opening and closing the insertion slot. An extension portion projects from the shutter blade in the first direction, the extension portion having a smaller size than the shutter blade with respect to a direction transverse to the first direction, being offset from the insertion slot toward the open position, and having the coupling portion at a distal end.

Furthermore, a stationary plate portion is disposed on a side of the open position of the shutter relative to the insertion slot, to extend along the elongate slot shape. A passage opening is formed in an intermediate region of the stationary plate portion. The shutter further includes an intermediate portion, inserted through the passage opening movably, disposed to extend between an edge portion of the shutter blade and an edge portion of the extension portion. The shutter blade is positioned outside the stationary plate portion, and the coupling portion is positioned inside the stationary plate portion.

The loading mechanism includes plural arms for moving the disk by swinging. A loading slider actuates the arms by sliding. A cam groove is formed in the loading slider. The shift lever includes a cam follower pin, positioned at the first lever end portion, inserted in the cam groove and driven thereby.

Furthermore, a base panel is disposed in the casing in a stationary manner, and having the loading mechanism mounted thereon.

In one aspect of the invention, a disk device is provided, there being a casing for containing a disk. An insertion slot passes the disk to load in the casing. A loading mechanism loads the disk in the casing or unloads the disk from the casing through the insertion slot. A shutter is shiftable transversely to an elongate slot shape of the insertion slot, for closing the insertion slot at least partially when in a closed position, and for opening the insertion slot when in an open position. A coupling portion is disposed at an end of the shutter with respect to the elongate slot shape. A shift lever is movable pivotally, connected with the loading mechanism, for moving the coupling portion in a first direction along the elongate slot shape in response to shifting of the loading mechanism in a loading direction, and for moving the coupling portion in a second direction along the elongate slot shape in response to shifting of the loading mechanism in an unloading direction. A cam mechanism shifts the shutter to the closed position when the coupling portion is moved in the first direction, and shifts the shutter to the open position when the coupling portion is moved in the second direction.

Consequently, double loading of disks through an insertion slot can be prevented effectively, because the shutter as a single element in a simplified form can operate effectively for opening and closing the insertion slot.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
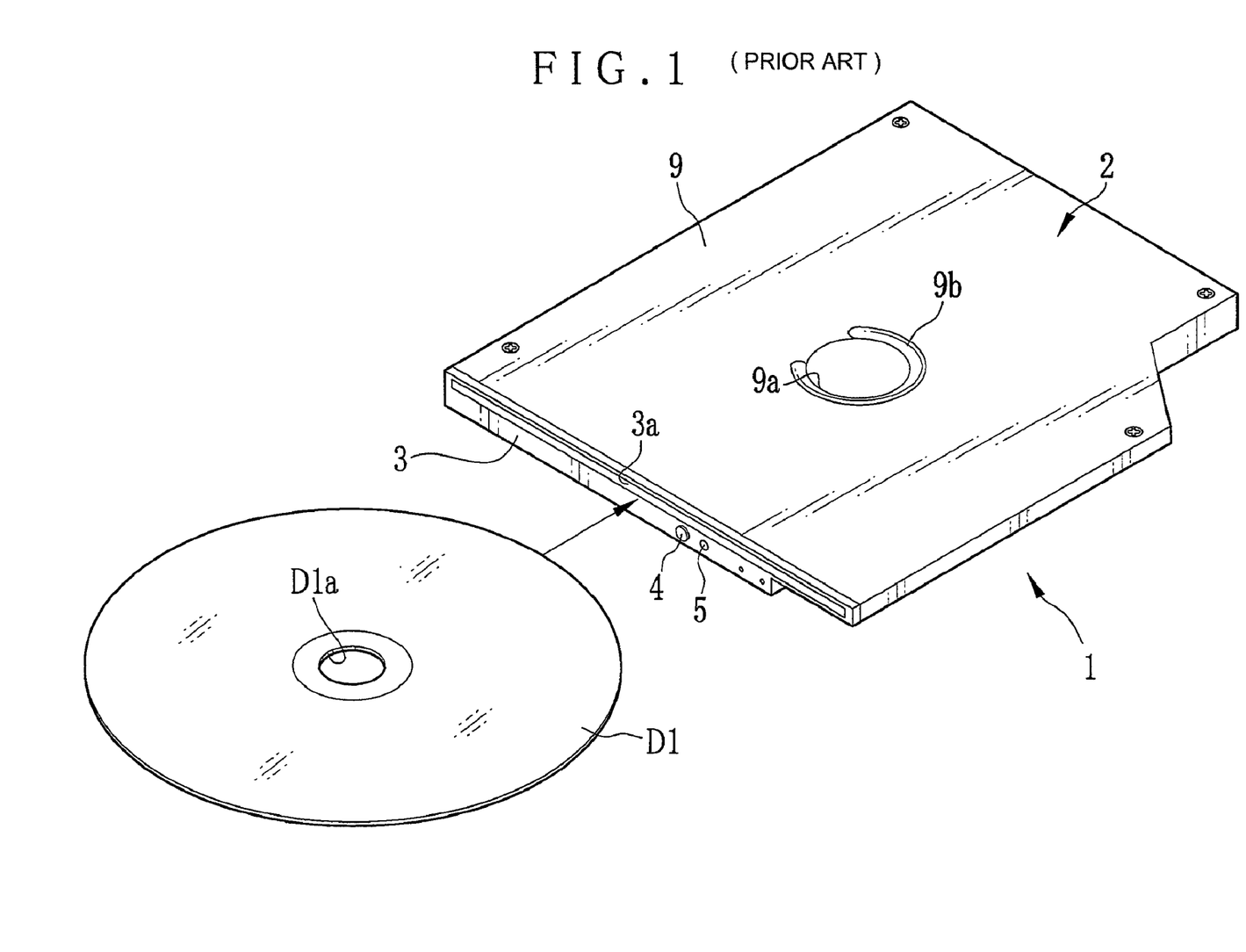
FIG. 1 is a perspective view illustrating an optical disk device and a disk.

In FIG. 1, an optical disk device 1 or optical disk drive is illustrated, and includes a casing 2 and a front bezel 3 attached to the casing 2. The bezel 3 includes an insertion slot 3a, a pushbutton 4 and an indicator 5. The insertion slot 3a has a form suitable for inserting a disk D1 having a diameter of 12 cm as an optical information recording medium. The pushbutton 4 is manually operable for inputting a command signal to eject the disk D1. The indicator 5 indicates a state of operation of the optical disk device 1. A center hole D1a is formed in the disk D1 for chucking.

Figure 2:
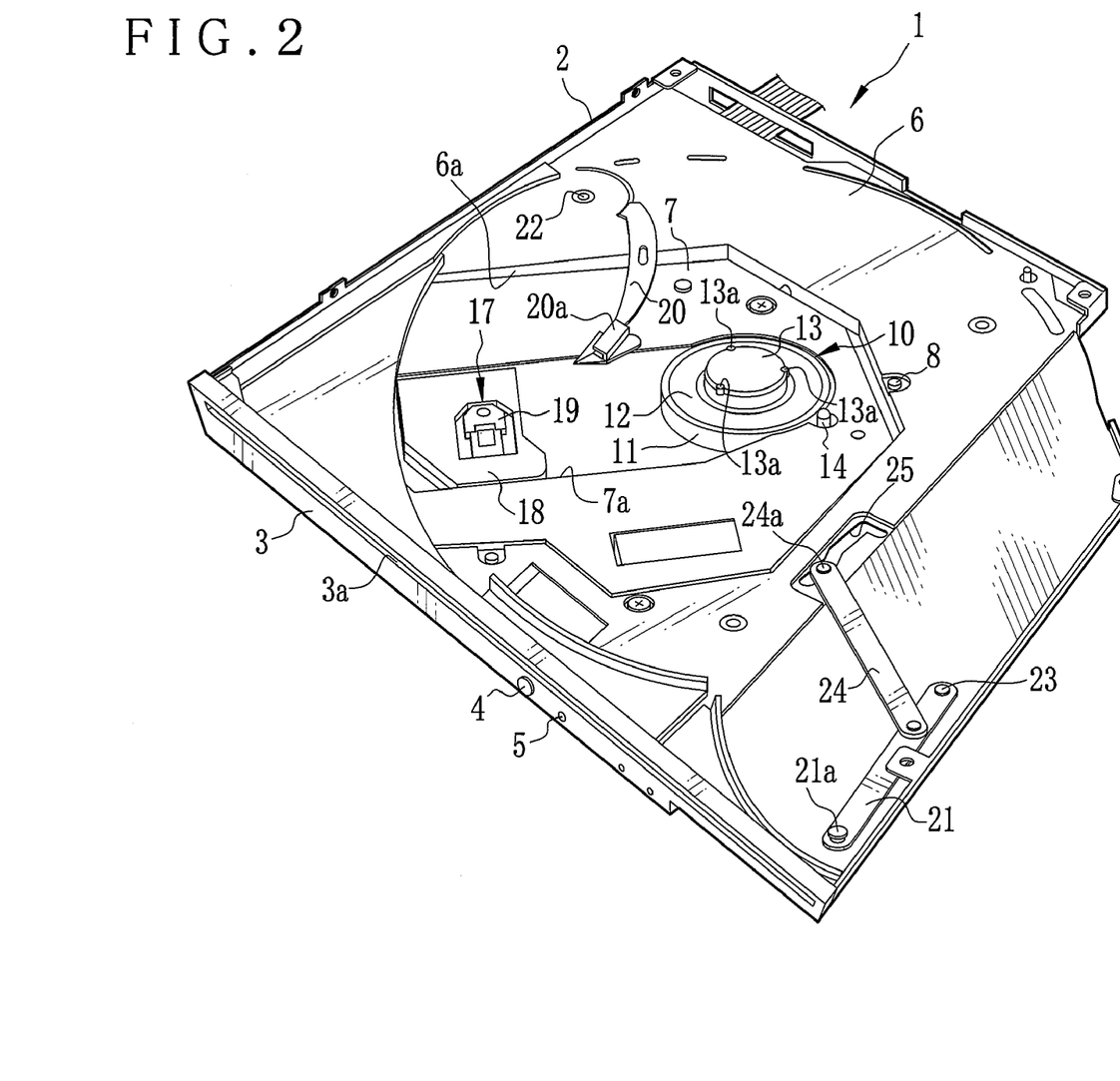
FIG. 2 is a perspective view illustrating various mechanical elements inside the optical disk device.

A top plate 9 is secured to the casing 2. A receiving hole 9a is formed in the top plate 9 at its center. A chuck head 13 of FIG. 2 is slightly inserted in the receiving hole 9a for the purpose of chucking the disk D1. Also, a recess 9b is formed in the top plate 9 and disposed around the receiving hole 9a, and operates as a portion to form an inner projection on an inner surface of the casing 2. The inner projection of the casing 2 receives the disk D1 in insertion of the chuck head 13 through the center hole D1a of the disk D1.

Figure 3:
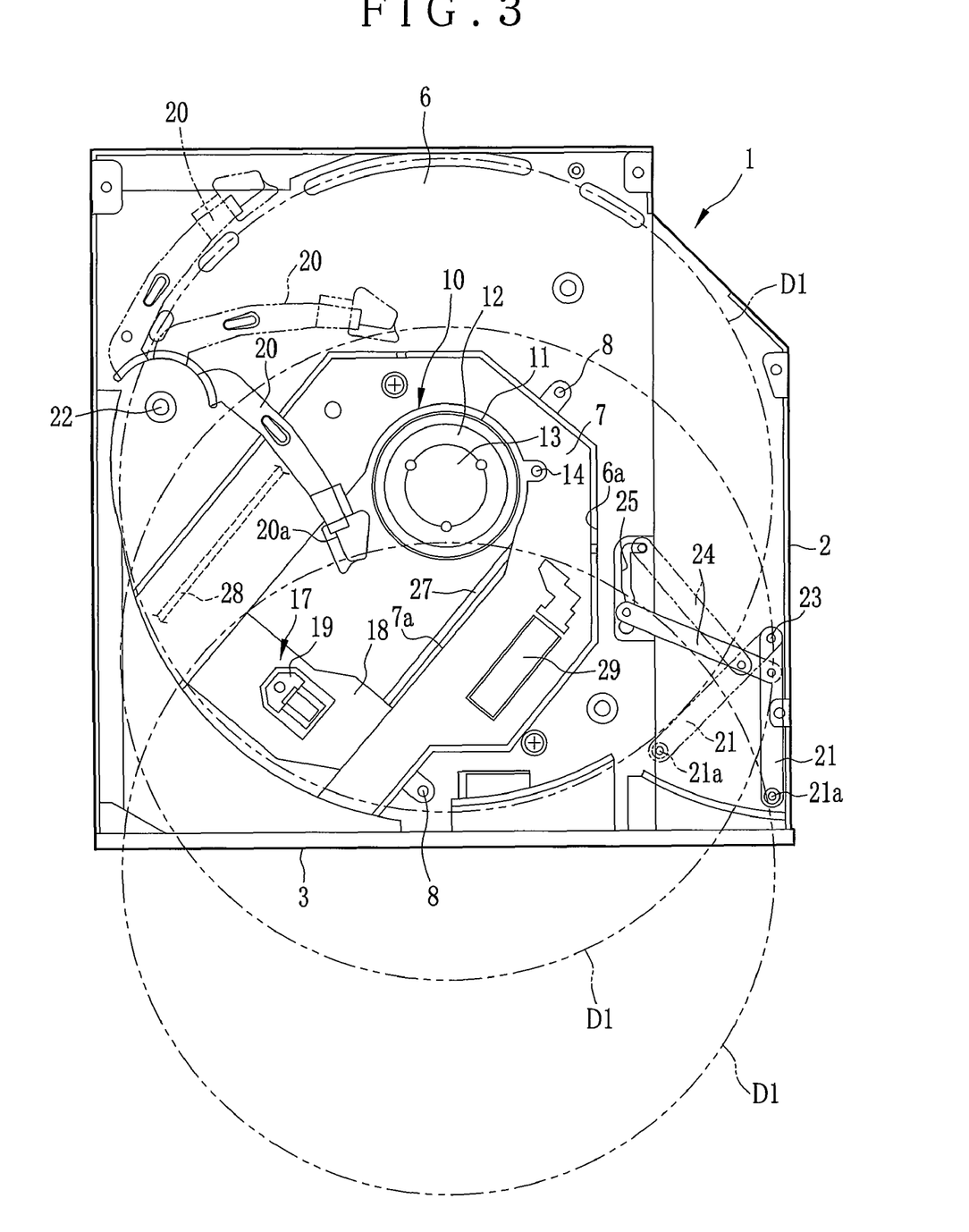
FIG. 3 is an explanatory view in a plan illustrating the various mechanical elements.

In FIGS. 2 and 3, a stationary base panel 6 is fixed to the inside of the casing 2 and defines two inner chambers. A panel opening 6a is formed in the base panel 6 and extends diagonally. A lifting frame 7 is disposed in the panel opening 6a. A cushion support assembly 8 or cushion support mechanism, which is well-known in the field of the disk player, is disposed to secure the lifting frame 7 to the base panel 6 in plural positions. To move the disk D1 into or out of the casing 2, the lifting frame 7 pivotally moves about an axis on the side of the bezel 3. A distal end of the lifting frame 7 moves up and down near the center of the disk drive. A pickup aperture 7a is formed in the lifting frame 7 and extends diagonally from the center.

A rotating mechanism 10 or drive unit is secured to an end of the lifting frame 7. The rotating mechanism 10 includes a spindle motor 11 as actuator, a turntable 12 and the chuck head 13. The spindle motor 11 is fixed to the rear of the lifting frame 7. The turntable 12 is secured to an output shaft of the spindle motor 11. The chuck head 13 is included in a unit having the turntable 12. When the lifting frame 7 is moved up, the chuck head 13 enters the center hole D1a in the disk D1 of FIG. 1. Plural chuck claws 13a are incorporated in the chuck head 13, are biased by a spring, and retain the disk D1 removably. A release pin 14 receives the disk D1 when the lifting frame 7 moves down, and removes the disk D1 from the chuck head 13 by pushing.

An optical pickup 17 or optical pickup assembly is mounted on the lifting frame 7. The optical pickup 17 includes a carriage 18 and an optical pickup head 19. The carriage 18 is positioned for access through the pickup aperture 7a of the lifting frame 7. The optical pickup head 19 is supported on the carriage 18. To write or read information, the carriage 18 moves along the pickup aperture 7a.

A support arm 20 or first arm and a load arm 21 or second arm in plural arms are disposed on the base panel 6. The support arm 20 swings to load and unload the disk D1. The load arm 21 advances the disk D1 into the casing 2 when the disk D1 passes through the insertion slot 3a. An edge holder 20a of the support arm 20 captures an inner end of the disk D1, and swings about a pivot 22. A flanged roller 21a of the load arm 21 is engaged with an outer end of the disk D1. There is a pivot 23 about which the load arm 21 swings. An intermediate lever 24 is connected to swing the load arm 21. A cam follower pin 24a of the intermediate lever 24 moves on a path along a cam groove 25.

In FIG. 3, three states of the disk D1 are illustrated. In a first one of the states, the disk D1 is in an ejection position. In a second one of the states, the disk D1 is in a start position for automatic loading. In a third one of the states, the disk D1 is in the writing/reading position after the chucking operation.

Figure 4:
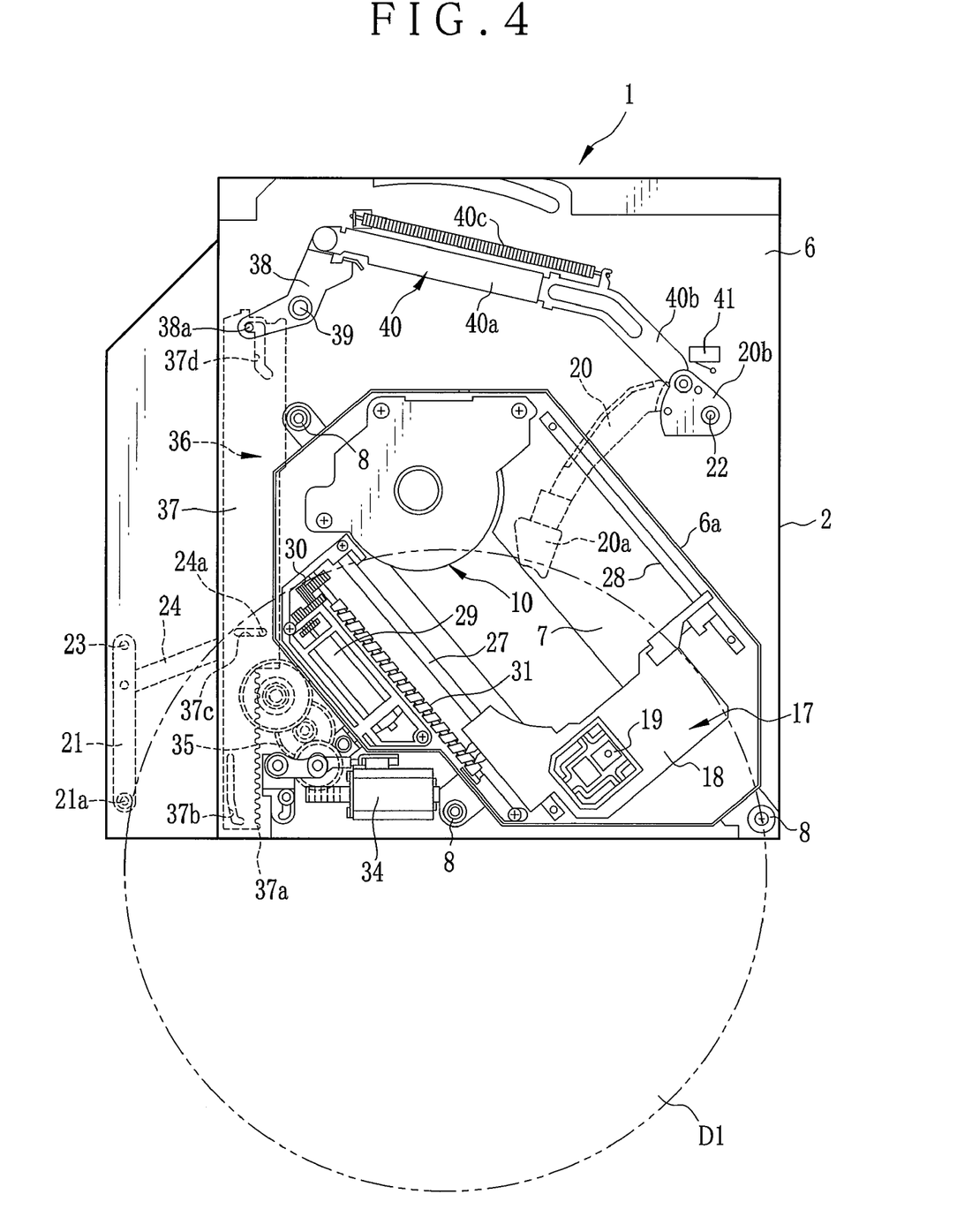
FIG. 4 is an explanatory view in a bottom plan illustrating the mechanical elements.

In FIG. 4, guide shafts 27 and 28 support the carriage 18 on which the optical pickup head 19 is mounted. Ends of the guide shafts 27 and 28 are fixedly secured to the lower surface of the lifting frame 7. There is a thread motor 29, of which rotations are transmitted by a gear train 30 to a screw shaft 31. The carriage 18 is moved back and forth by rotations of the screw shaft 31.

A loading motor 34 is disposed on the lower surface of the base panel 6. A gear train 35 is connected with an output shaft of the loading motor 34. To a loading mechanism 36 or transport mechanism, rotations of the loading motor 34 are transmitted by the gear train 35, to move the disk D1 into or out of the casing 2. The loading mechanism 36 has various mechanical elements including a loading slider 37, the support arm 20 and the load arm 21.

A rack gear 37a is a portion of the loading slider 37 at its end. One gear in the gear train 35 at its end is meshed with the rack gear 37a. The loading slider 37 slides in and out on a lateral wall of the casing 2 when the loading motor 34 rotates. When the loading slider 37 slides away from the bezel 3 or in the inward direction, the disk D1 is loaded in the casing 2. When the loading slider 37 slides in the outward direction, the disk D1 is unloaded from the casing 2.

Figure 5:
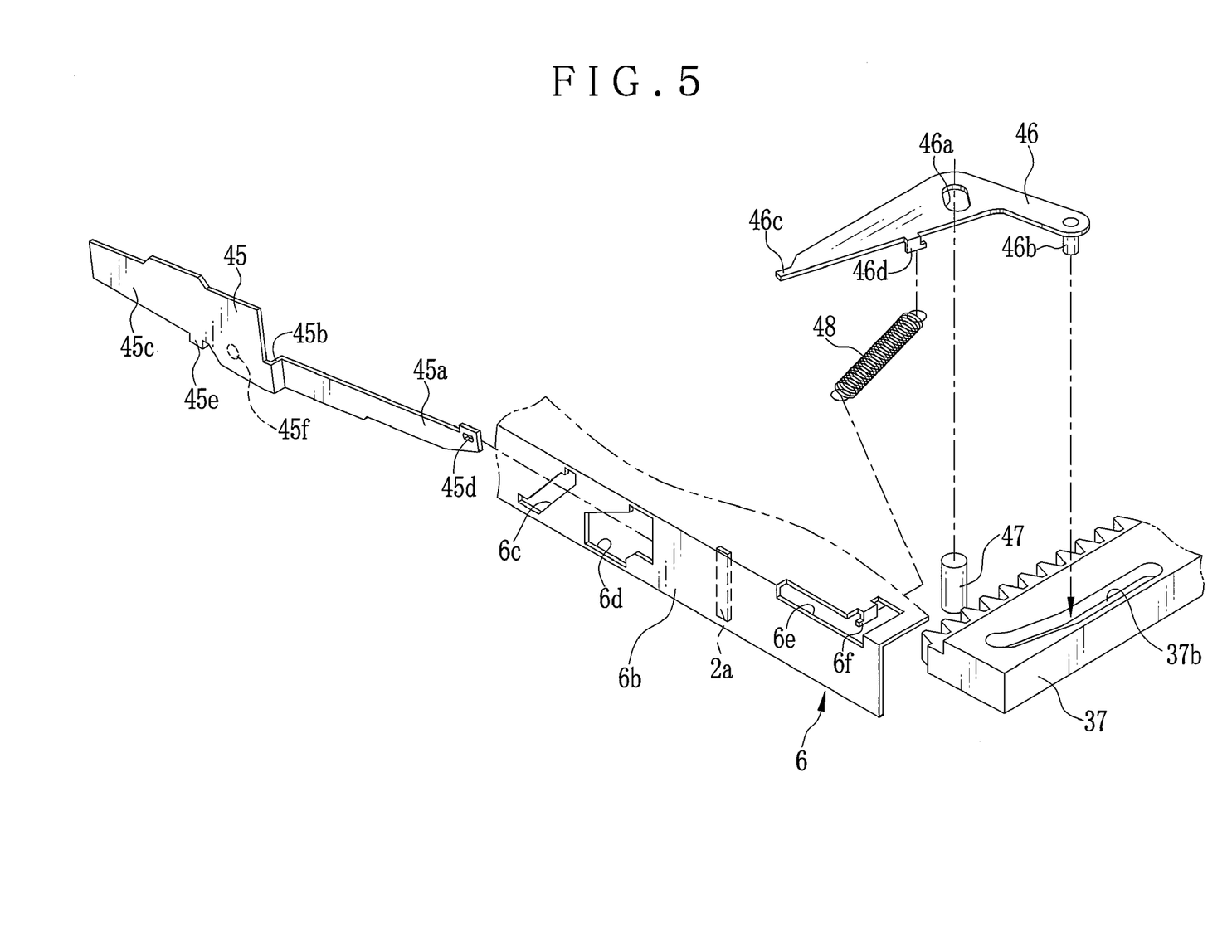
FIG. 5 is an exploded perspective view illustrating a shutter, a shift lever and a stationary plate portion in the optical disk device.

Plural cam grooves are formed in the loading slider 37. A cam groove 37b of FIG. 5 is disposed beside the rack gear 37a and operates for opening and closing a shutter 45. A cam groove 37c is formed to press the cam follower pin 24a of the intermediate lever 24. A cam groove 37d is formed to actuate a link lever 38. The cam groove 37c extends horizontally, and drives the cam follower pin 24a to move along the cam groove 25 by pressure in a sliding direction of the loading slider 37.

A cam follower pin 38a of the link lever 38 is engaged with the cam groove 37d of the loading slider 37. There is a pivot 39 about which the link lever 38 rotates when the loading slider 37 is slid. A link arm 40 connects a pusher plate 20b at one end portion of the support arm 20 with the link lever 38. The pusher plate 20b is secured by the pivot 22 to the support arm 20, which lies on the upper surface of the base panel 6. A detection switch 41 is disposed near to the pusher plate 20b, and turned on when the support arm 20 is rotated by advance of the disk D1. A control unit (not shown) is responsive to an output signal of the detection switch 41, and rotates the loading motor 34 to start automatic advance of the disk D1.

The link arm 40 includes a first slide rod 40a, a second slide rod 40b and a tension coil spring 40c. The second slide rod 40b is coupled with the first slide rod 40a in a slidable manner. The tension coil spring 40c is connected to bias the first and second slide rods 40a and 40b toward one another for minimizing the total length of the link arm 40. While the disk D1 is depressed within the casing 2 by a user, the link arm 40 sets the support arm 20 in a pivotally movable state without actuating the link lever 38 before a start of automatic loading.

Figure 6:
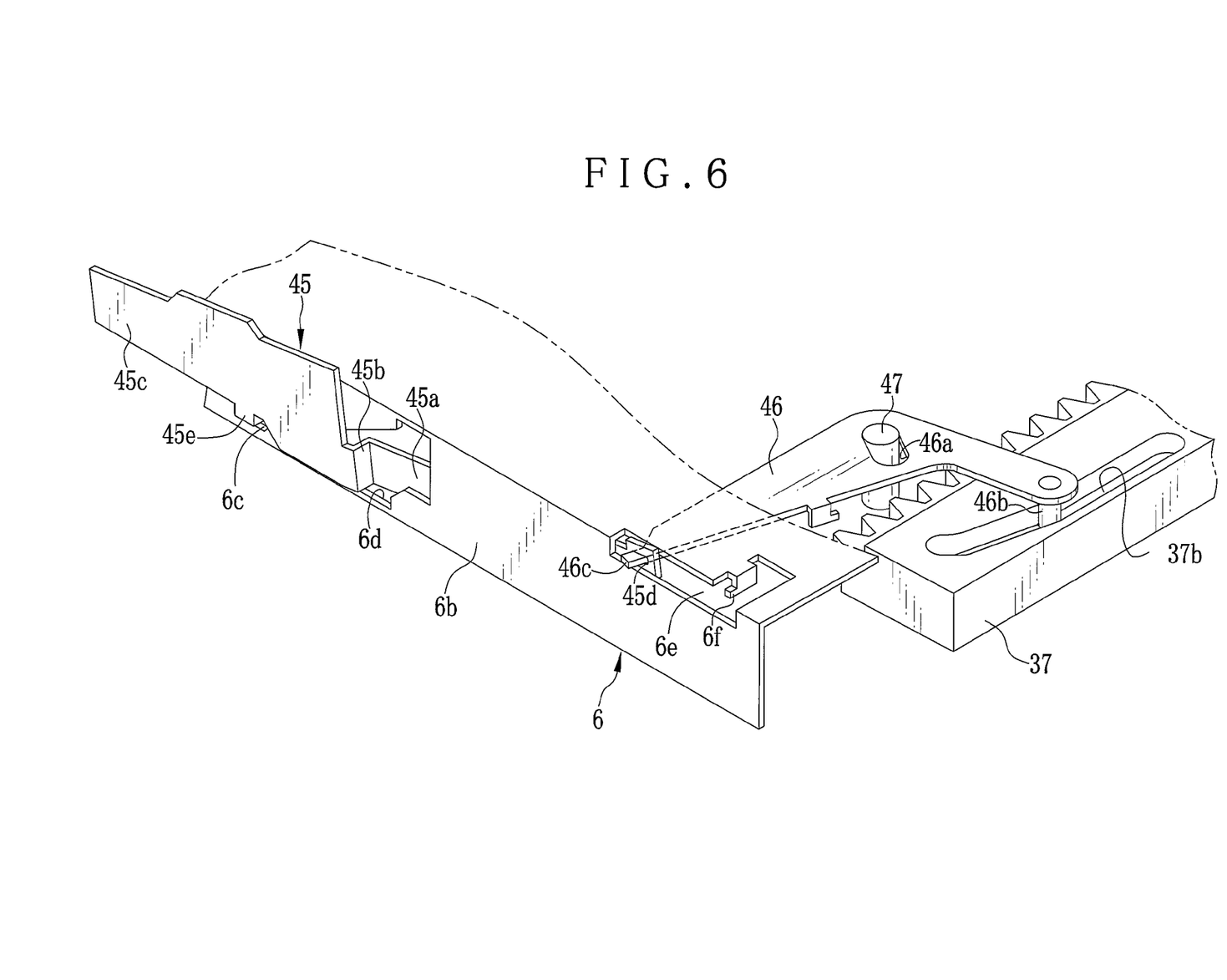
FIG. 6 is a perspective view illustrating the same as FIG. 5 but in an assembled state.
Figure 7A:
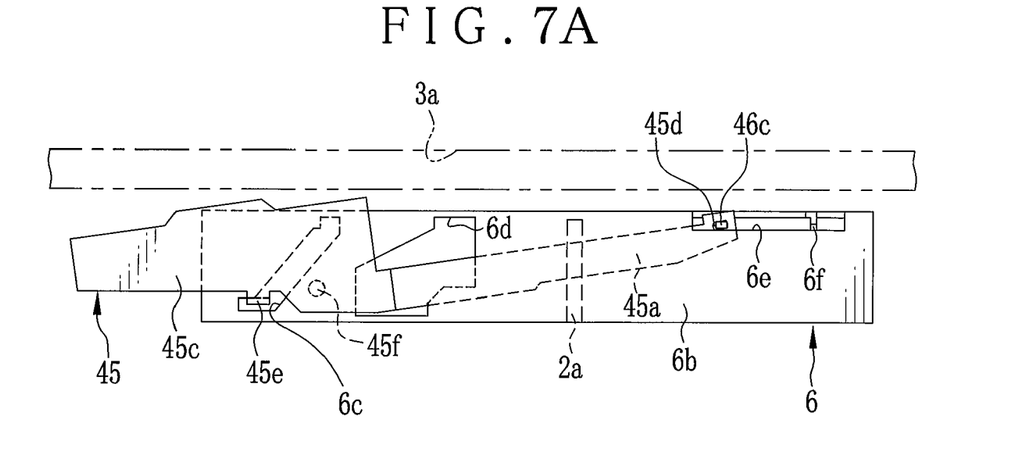
FIG. 7A is an explanatory view in an elevation illustrating a state of the shutter in an open position.
Figure 7B:
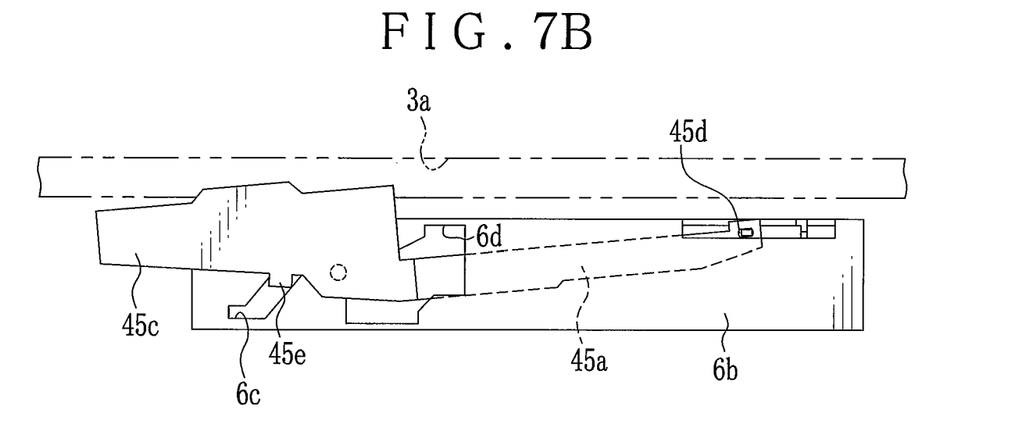
FIG. 7B is an explanatory view in an elevation illustrating a state of the shutter shifted toward a closed position.
Figure 7C:
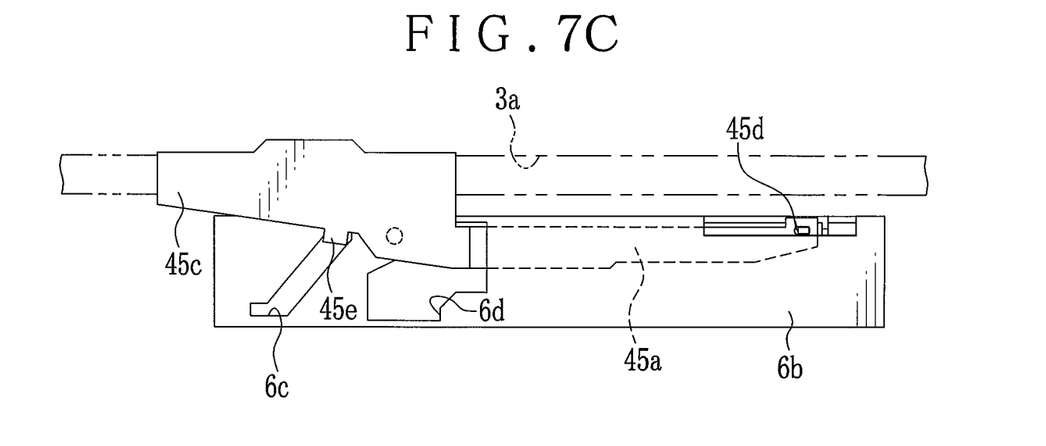
FIG. 7C is an explanatory view in an elevation illustrating a state of the shutter in the closed position.

In FIGS. 5 and 6, a stationary plate portion 6b or extension flange extends from the base panel 6 and is formed by bending. A cam surface 6c defined in a cam opening, a passage opening 6d and an access opening 6e are formed in the stationary plate portion 6b. A connection end 6f is positioned at a projection formed on the base panel 6. Note that the cam surface 6c may be formed in a cam groove in place of the cam opening according to the invention.

The shutter 45 is movable in a composite manner of moving longitudinally and moving on a curve arcuately according to the form of the stationary plate portion 6b. The shutter 45 includes an extension portion 45a of a smaller width, an intermediate portion 45b and a shutter blade 45c at an end portion. The shutter 45 has a crank shape as viewed downwards in a top plan. A coupling hole 45d is formed in a right end of the extension portion 45a. The intermediate portion 45b is inserted in the passage opening 6d. The extension portion 45a is disposed inside the stationary plate portion 6b. The shutter blade 45c is disposed outside the stationary plate portion 6b. In the casing 2, a ridge 2a is formed to extend erectly from its lower surface. The extension portion 45a is set between the ridge 2a and the stationary plate portion 6b and kept oriented vertically.

Figure 8A:
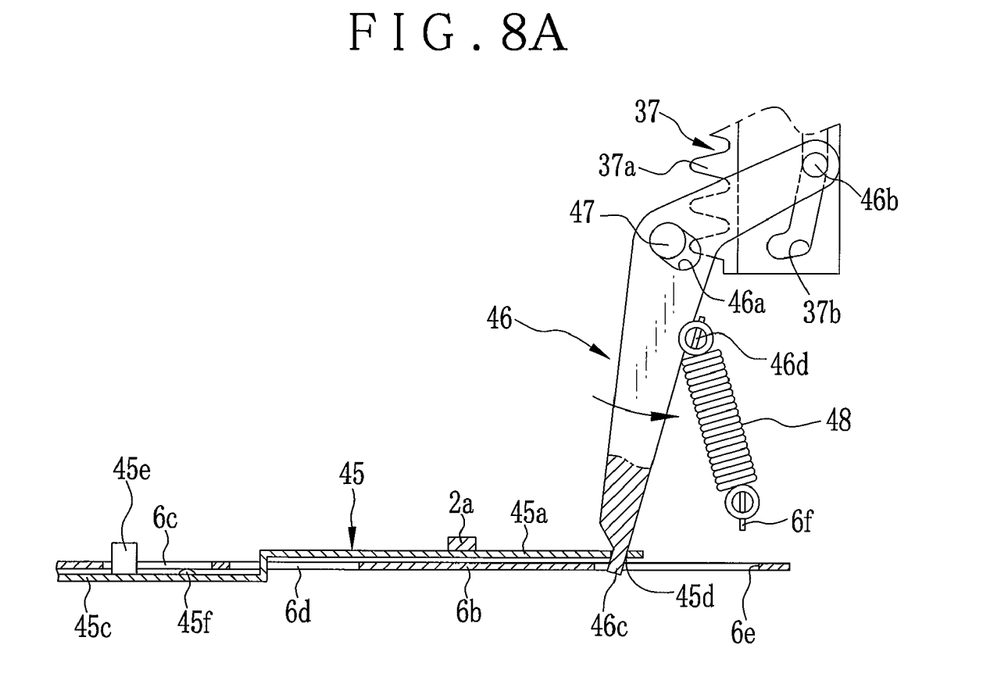
FIG. 8A is an explanatory view in a plan illustrating a state of a shift lever with the shutter in the open position.
Figure 8B:
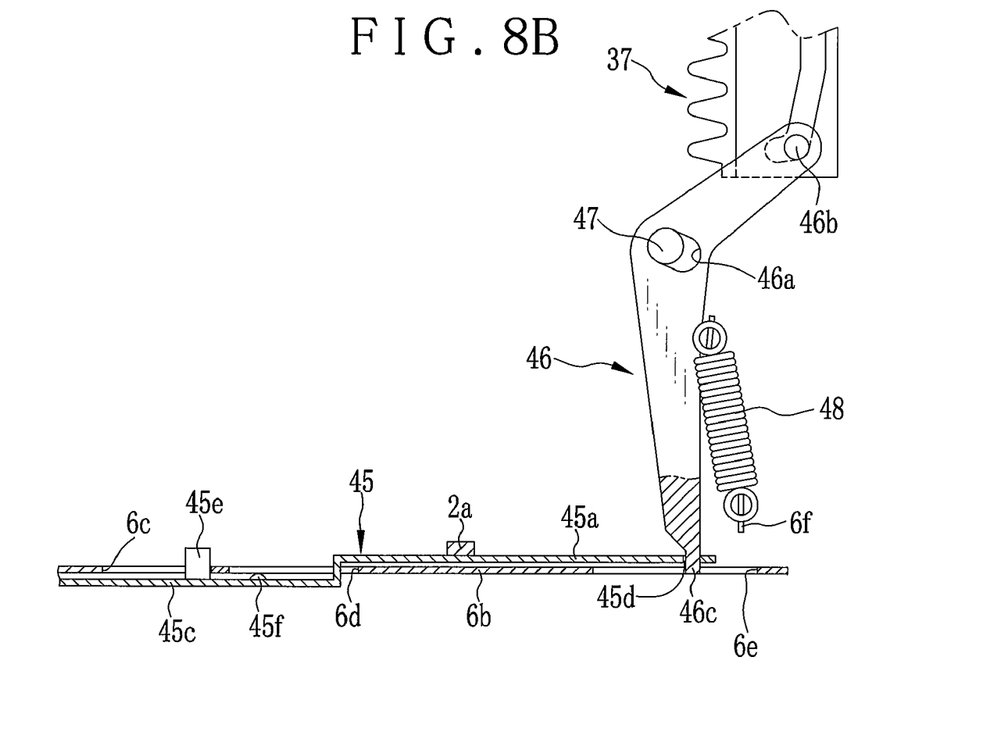
FIG. 8B is an explanatory view in a plan illustrating a state of the shift lever with the shutter in the closed position.

A cam follower projection 45e is formed to project from the shutter blade 45c in the inward direction by bending. The cam follower projection 45e is engaged with the cam surface 6c, and when the shutter 45 moves longitudinally to the right in FIG. 5, shifts up the shutter blade 45c by rotating the shutter 45. A contact projection 45f is formed on an inner surface of the shutter blade 45c for contacting the outer surface of the stationary plate portion 6b. The contact projection 45f operates to reduce an area of contact between the shutter blade 45c and the cam surface 6c, and enables the shutter 45 to move smoothly. See FIG. 8.

A shift lever 46 transmits movement of the loading slider 37 to the shutter 45 to move in response to loading and unloading of the disk D1. A lever slot 46a is formed in the shift lever 46. A stationary pivot pin 47 is inserted in the lever slot 46a for support. A cam follower pin 46b projects from a lever end portion of the shift lever 46, and is inserted in the cam groove 37b of the loading slider 37. A lever end portion 46c of the shift lever 46 is inserted in the coupling hole 45d. A portion of the lever end portion 46c protruding from the coupling hole 45d is disposed to extend through the access opening 6e.

A connection end 46d is a portion of the shift lever 46. A tension coil spring 48 has a first end secured to the connection end 46d, and biases the shift lever 46 for contact of an inner end of the lever slot 46a with the stationary pivot pin 47. A second end of the tension coil spring 48 is secured to the connection end 6f. Note that the tension coil spring 48 is not depicted in FIG. 6 for the purpose of clarification. Note that it is likely to move the disk D1 into the disk drive even when the shutter 45 is broken and not movable longitudinally. At this time, the loading slider 37 may operate to rotate the shift lever 46 in a counterclockwise direction. However, the shift lever 46 is shifted for contact of a right end of the lever slot 46a with the stationary pivot pin 47 against the tension coil spring 48. Therefore, no excessive force will be exerted to the shift lever 46, which can be free from damage. No overload of the loading motor 34 to cause damage will occur.

The operation of the above construction is described with reference to FIGS. 7A-8B. Before insertion of the disk D1, the shutter 45 is in the open position where the shutter blade 45c is lower than the insertion slot 3a in FIG. 7A. The shutter 45 is ready for insertion of the disk D1.

In FIGS. 3 and 4, an inner end of the disk D1 is captured by the edge holder 20a of the support arm 20 upon advance through the insertion slot 3a of the bezel 3. The support arm 20 with the pusher plate 20b is rotated by the advance of the disk D1 in the clockwise direction in FIG. 4 about the pivot 22 while the link arm 40 is extended.

When the support arm 20 is further swung in, the pusher plate 20b turns on the detection switch 41. In response to an output signal of the detection switch 41, the loading motor 34 starts rotating. Rotations of the loading motor 34 are transmitted by the gear train 35 to the loading slider 37. The loading slider 37 is slid in the inward direction away from the bezel 3.

When the loading slider 37 slides inwards, the cam groove 37c drives the cam follower pin 24a of the intermediate lever 24. Then the cam follower pin 24a is moved on the path along the cam groove 25. Thus, the intermediate lever 24 swings. The load arm 21 swings in the clockwise direction about the pivot 23 in FIG. 3. The flanged roller 21a at the end of the load arm 21 pushes the outer end of the disk D1.

In the loading slider 37, the cam groove 37d causes the link lever 38 to rotate clockwise in FIG. 4. The link arm 40 transmits the rotation of the link lever 38 to the pusher plate 20b to rotate the support arm 20 clockwise in FIG. 4. Thus, the disk D1 is loaded in the casing 2 by the support arm 20 and load arm 21.

When the disk D1 moves to the chuck position shortly before the writing/reading position of FIG. 3, the center hole D1a of the disk D1 is positioned at the chuck head 13. Then the lifting frame 7 is moved up by movement of the loading slider 37. The chuck head 13 enters the center hole D1a of the disk D1 to chuck the disk D1 with the chuck claws 13a. Upon moving up with the chuck head 13, the disk D1 is received by the inner projection of the casing 2 formed in the position of the recess 9b of the top plate 9. After the chucking, the lifting frame 7 moves down slightly to set the disk D1 away from the top plate 9.

In the chucking operation, the support arm 20 and load arm 21 remain stopped. After the same, a final portion of the stroke of the loading slider 37 shifts the support arm 20 and load arm 21 away from the disk D1 for release. The loading slider 37 turns on a switch (not shown) in response to the release of the support arm 20 and load arm 21 for the disk D1. Thus, the loading motor 34 is stopped to terminate the loading of the disk D1.

In response to the loading of the disk D1, the shutter 45 is actuated. At the same time as the disk D1 is chucked, the cam groove 37b of the loading slider 37 drives the cam follower pin 46b. The shift lever 46 rotates about the stationary pivot pin 47 counterclockwise from the position of FIG. 8A to the position of FIG. 8B. The shutter 45 is moved longitudinally to the right by rotation of the shift lever 46.

As the cam follower projection 45e is coupled with the cam surface 6c of the base panel 6, the shutter 45 upon moving longitudinally toward the right side is guided along the cam surface 6c. See FIG. 7B. The shutter 45 turns clockwise about the coupling hole 45d arcuately on the curved path. When chucking of the disk D1 is completed, the shutter 45 comes to the closed position of FIG. 7C. Thus, the insertion slot 3a is partially closed, and can prevent erroneous loading of another disk while the disk D1 is contained in the casing 2. Note that the shutter 45 blocks a middle portion of the insertion slot 3a with reference to a horizontal direction when in the closed position.

The shutter 45 turns between the open and closed positions about the coupling hole 45d at the end of the extension portion 45a of the smaller width. A distance from the center of the turning to the shutter blade 45c can be maximized. A rotational angle from the open position to the closed position can be small in comparison with a structure where a center of the extension portion 45a in the horizontal direction is the rotational center. This is effective in enlarging the size of the shutter blade 45c in both of the vertical and horizontal directions. Also, the shutter 45 is actuated by the shift lever 46 directly. This is effective in reducing the size of the optical disk device 1 in the front-to-back direction in comparison with a disk device in which a sliding structure is disposed between a shift lever and a shutter. The shutter 45 can operate in the invention to open and close the insertion slot 3a in a reliable manner even with the reduced size.

When the disk D1 is chucked and the insertion slot 3a is closed with the shutter 45, then the spindle motor 11 rotates. The turntable 12 and the chuck head 13 cause the disk D1 to rotate at a high speed with the spindle motor 11. The optical pickup head 19 is moved radially with respect to the form of the disk D1 during its high speed rotations, to record or play back information.

To unload the disk D1 from the casing 2, the pushbutton 4 on the bezel 3 is depressed manually, or a command signal for unloading is input to the optical disk device 1 by an external device. At first, a control unit (not shown) of the optical disk device 1 stops the spindle motor 11, and causes the loading motor 34 to rotate backwards. The backward rotations of the loading motor 34 move the loading slider 37 toward the bezel 3 in the outward direction. The shift lever 46 is rotated clockwise by the outward movement of the loading slider 37, to move the shutter 45 to the left longitudinally in FIG. 7C. The shutter 45 turns about the coupling hole 45d counterclockwise, becomes oriented in the state of FIG. 7B, and returns to the open position of FIG. 7A.

When the advance of the loading slider 37 starts, the support arm 20 and load arm 21 swing to a small extent, and contact the peripheral edge of the disk D1. Then the lifting frame 7 moves down. As the disk D1 is received by the release pin 14 during the movement of the lifting frame 7, the disk D1 is pushed and removed from the chuck head 13. After the lifting frame 7 moves down, the support arm 20 and load arm 21 swing again to move the disk D1 to the ejection position of FIG. 4.

In the embodiment, the closing movement of the shutter 45 is started nearly at the same time as the completion of chucking the disk D1. However, it is possible to carry out the closing movement after passage of the outer end of the disk D1 through the insertion slot 3a and before completion of the loading of the disk D1.

In the above embodiment, the disk D1 is 12 cm across. However, a disk D1 for use in the present invention may have a diameter of 8 cm.

Also, the disk drive may be a composite type including an 8 cm disk loading mechanism and may be usable selectively for an 8 cm disk and a 12 cm disk. A horizontal size of the shutter 45 in the state of blocking the insertion slot 3a is predetermined so that if an 8 cm disk is advanced erroneously in the mode for a 12 cm disk, the disk will contact the shutter 45 before contacting a 12 cm disk no matter which of the two gaps the disk passes beside the insertion slot 3a.

Also, it is possible to form a cam surface with the shutter 45 and form a cam follower pin with the base panel 6. Furthermore, a cam groove may be formed in the inner wall of the bezel 3 for guiding the cam follower projection 45e of the shutter 45.

Also, an extension portion of a bent shape may be formed with the extension portion 45a, and may be inserted in a specific connection hole formed in an end portion of the shift lever 46 for coupling.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device for writing and/or reading data in a disk in a casing, comprising:
   an insertion slot formed in said casing;
   a loading mechanism for loading said disk in said casing or unloading said disk from said casing through said insertion slot;
   a shutter shiftable between a closed position and an open position, for closing said insertion slot at least partially to prevent said disk from passing when in said closed position, and for opening said insertion slot to allow said disk to pass when in said open position;
   a shift lever, disposed for connection between said loading mechanism and said shutter, for moving said shutter in a first direction along an elongate slot shape of said insertion slot upon passage of said disk through said insertion slot according to operation for loading said disk, and for moving said shutter in a second direction reverse to said first direction before passage of said disk through said insertion slot according to operation for unloading said disk;
   a cam mechanism, including a cam surface and a cam follower projection, said cam surface being formed with one of said shutter and a stationary plate portion of said casing, said cam follower projection being formed with a remaining one of said shutter and said stationary plate portion, said cam mechanism shifting said shutter to said closed position when said shutter moves in said first direction, and shifting said shutter to said open position when said shutter moves in said second direction.

2. The disk device as defined in claim 1, wherein said shutter includes:
   a coupling hole formed in a first end portion;
   a shutter blade disposed at a second end portion;
   a first lever end portion of said shift lever is inserted in said coupling hole, and said shutter is arcuately turned by said cam mechanism about said coupling hole;
   said shutter blade partially closes said insertion slot when said shutter is in said closed position.

3. The disk device as defined in claim 2, wherein said stationary plate portion includes a cam groove and an opening, said cam groove extending with an inclination relative to said insertion slot, and having said cam surface defined therein;
   said shutter includes an intermediate portion, having a bend in a crank form, disposed between said coupling hole and said shutter blade, inserted in said opening, wherein said stationary plate portion having a first surface where a portion of said shutter with said coupling hole is opposed, and a second surface where a portion of said shutter with said shutter blade is opposed.

4. The disk device as defined in claim 3, further comprising a contact projection, formed on said shutter, opposed to said stationary plate portion, for reducing an area of contact between said shutter and said stationary plate portion.

5. The disk device as defined in claim 3, wherein said stationary plate portion has a base panel, stationary in said casing, for supporting said loading mechanism mounted thereon.

6. The disk device as defined in claim 1, wherein said loading mechanism includes:
   a loading motor for rotating forwards upon advance of said disk into said insertion slot at a predetermined depth, and for rotating backwards for unloading;
   a loading slider for sliding in a direction according to one of rotational directions in which said loading motor rotates; and
   plural arms, driven by said loading slider, for swinging in contact with said disk.

7. The disk device as defined in claim 6, wherein said shift lever includes a cam pin disposed at a second lever end portion;
   said loading slider includes a cam groove for receiving insertion of said cam pin for engagement.

* * * * *